Feb. 4, 1958     E. F. WALKER     2,821,834
COLLAPSIBLE RAKE
Filed Oct. 26, 1954
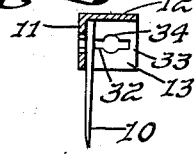
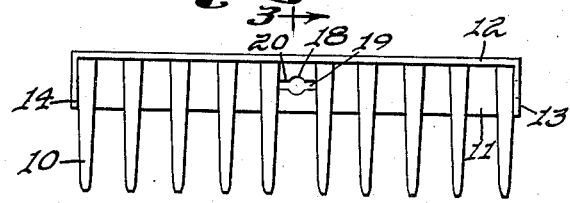
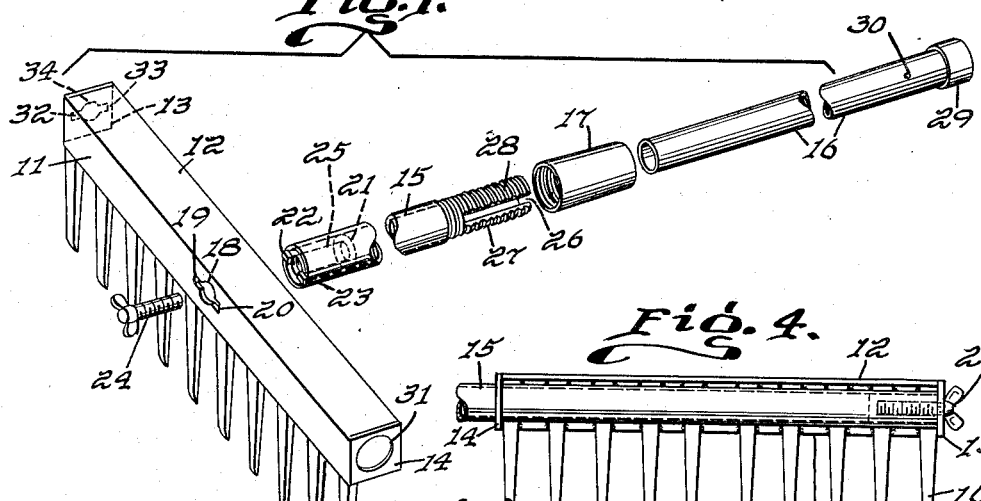
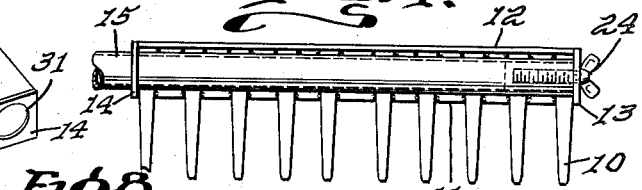
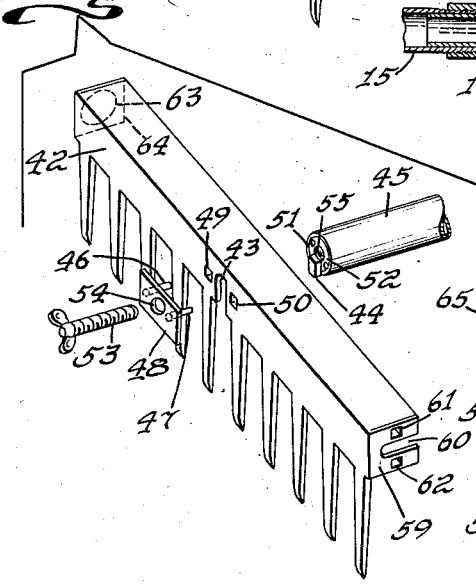
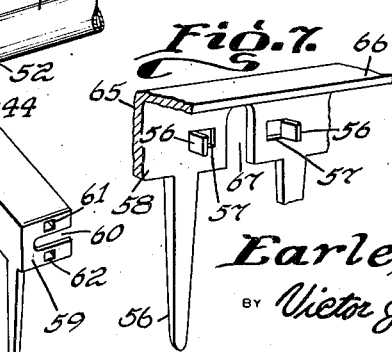
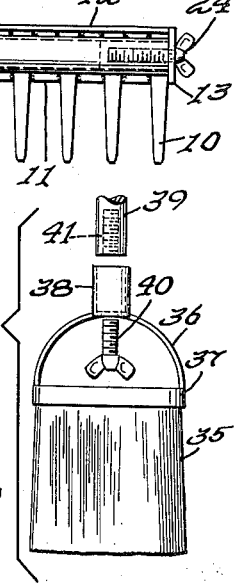
INVENTOR.
*Earle F. Walker*
BY *Victor J. Evans & Co.*
ATTORNEYS

United States Patent Office 2,821,834
Patented Feb. 4, 1958

2,821,834

COLLAPSIBLE RAKE

Earle F. Walker, Los Angeles, Calif.

Application October 26, 1954, Serial No. 464,760

3 Claims. (Cl. 56—400.19)

This invention relates to garden tools of the folding or collapsible type, and in particular, a rake having a sectional handle with an outer section telescoping in an inner section and with the inner section removably attached to the head of the rake whereby the inner section, with the outer section therein, is adapted to be incorporated in the backing or head portion of the rake.

The purpose of this invention is to provide a rake that is particularly adapted for sportsmen and travelers, and particularly for picnics where it is desired to clear an area for spreading a table cloth or the like, and in particular, a rake that is adapted to be carried in a trunk or other part of a motor vehicle.

Various attempts have been made to provide rakes of the collapsible or folding type, however, conventional rakes of this type attempt to fold the head or tooth or tine carrying bar and this requires relatively complicated bracing and other mechanical connections that make the cost prohibitive.

With this thought in mind, this invention contemplates a rake having tines extended from a head substantially rectangular shape in cross section, a tubular inner section adapted to be clamped to the central portion of the head and a telescoping outer section adapted to be clamped in the extended end of the inner section to provide a handle.

The object of this invention is, therefore, to provide means for connecting elements of a rake whereby a rake may readily be folded for carrying in a motor vehicle and wherein the rake is readily adapted to be set up for use.

Another object of the invention is to provide a collapsible rake that is adapted to be assembled and also taken apart by the average layman so that it may be used universally for picnics and the like.

A further object of the invention is to provide a collapsible rake that is of a simple and economical construction.

With these and other objects and advantages in view, the invention embodies a rake having a box like backing or head with tines extended therefrom and a telescoping handle having an inner section adapted to be clamped to the head of the rake and an outer telescoping section that is adapted to be, selectively, clamped to the extended end of the inner section so that it is extended for use, or incorporated in said inner section.

Other features and advantages of the invention will appear from the following description, taken in connection with the drawing, wherein:

Figure 1 is an exploded view, in perspective, illustrating a rake with a telescoping handle and showing the parts of the handle separated.

Figure 2 is an elevational view of the rake head looking toward the inner side of the head.

Figure 3 is a cross section through the head of the rake taken on line 3—3 of Figure 2.

Figure 4 is an elevational view also looking toward the inside of the head of the rake, similar to that shown in Figure 2, showing a portion of the handle in the head.

Figure 5 is a view showing a modification wherein a broom or other device is adapted to be mounted on the end of the handle instead of the rake and showing the parts in separated positions.

Figure 6 is a view showing another modification wherein a lug is provided at the lower side of the inner section of the handle and wherein the end of the handle is provided with recesses for receiving lugs projecting from the inner surface of the head.

Figure 7 is an enlarged view also showing the structure shown in Figure 6 showing the inside of the head.

Figure 8 is a view showing a longitudinal section through outer and inner sections of the handle of the rake illustrating the clamping means whereby the outer section is secured in adjusted position in the inner section.

Referring now to the drawing, wherein like reference characters denote corresponding parts, the improved rake of this invention includes a head having tines 10 extended from a front rake plate 11, the front plate being positioned with the upper edge connected to a cover plate 12 and the front and cover plates being connected to end plates 13 and 14, an inner tubular section 15 forming part of a handle and adapted to be clamped to the front plate 11 of the head and an outer telescoping section 16 also adapted to form part of a handle and being adapted to be clamped in the inner section 15 with a coupling 17.

In the design illustrated in Figures 1 to 4, inclusive, the front plate 11 is provided with an opening 18 having notches 19 and 20 at the sides and the lower end of the inner section 15 is provided with a plug 21 that is adapted to be positioned against the inner surface of the plate 11 with lugs 22 and 23 positioned in the notches 19 and 20, respectively. With the parts in position, a thumb screw 24 is extended through the opening 18 and threaded into a threaded opening 25 of the plug 21 whereby the inner section 15 is clamped to and rigidly held in the head of the rake.

The opposite end of the inner section 15 is threaded and longitudinally disposed slots 26 positioned in the threads, which are indicated by the numeral 27, provide means for urging threaded fingers 28, positioned between the slots 26 into gripping relation with the end of the outer section 16 whereby with the coupling 17 threaded on the fingers 28 the fingers are adapted to be forced into gripping relation with the outer section 16 to provide a rigid handle.

The outer end of the section 16 is provided with a cap 29 and an opening 30, providing a vent in the wall thereof.

With the parts assembled in this manner, the handle may readily be assembled and secured to the head to provide a rake that is particularly adapted for picnics and for use by sportsmen and the like.

To assemble parts in folded or collapsed positions, the inner section 15 is inserted through an opening 31 in the end plate 14 of the head with the lugs 22 and 23 in notches 32 and 33 of the end plate 13 and with the screw 24 extended through an opening 34 and threaded into the plug 21. In folding the rake, the coupling 17 is turned outwardly releasing the outer section 16 whereby the section 16 is adapted to be positioned in the inner section 15 to form a compact package.

In the design illustrated in Figure 5, the rake is replaced with a broom 35 having a bale 36 extended from a band 37 and the bale 36 is provided with a tubular socket 38 in which an end 39, such as the end of the inner section 15, may be clamped by a screw 40 with the screw being threaded into a threaded socket 41 similar to the socket 25.

In the design illustrated in Figures 6 and 7, a front plate 42, similar to the front plate 11, is provided with a U-shaped opening 43 into which a lug 44 on the lower side of a handle 45, similar to the handle formed with the sections 15 and 16, may be inserted and, in this design pins 46 and 47 extended from a plate 48 are adapted to extend through openings 49 and 50 in the front plate 42 and into notches 51 and 52 in the sides of the handle 45. The parts are retained in assembled relation by a screw 53 that extends through an opening 54 in the plate 48 and through the upper part of the U-shaped slot 43 into a threaded opening 55 in the end of the handle.

The modification shown in Figure 7 is somewhat similar except that lugs 56 struck from openings 57 in a front plate 58 are adapted to extend into the notches 51 and 52 in the end of the handle.

In the collapsed position the plate 48 of the design shown in Figure 6 is adapted to be positioned against an end plate 59 with the lug 44 in a slot 60 and with the pins 46 and 47 in openings 61 and 62 at the sides of the slot. In this position the screw 53 extends through the slot 60 and is threaded into the end of the handle 45, the opposite end of the handle being extended through an opening 63 in an end plate 64.

Also in this design a front plate 65 of the head, which is also provided with a cover plate 66, is provided with a U-shaped slot 67 that is positioned to receive the lug 44 and screw 53.

With the parts formed and assembled in this manner, it will be understood that a garden tool adapted to be used on a lawn or in a garden is provided, and the tool is also adapted to be taken apart and folded into a comparatively small package so that it may be carried in a motor vehicle of the pleasure type and used by sportsmen or on picnics or the like to clear an area for a blanket or for spreading a table cloth or the like.

With the parts assembled in this manner, they may readily be taken apart for storage, transportation, or shipping and may readily be assembled for use.

It will be understood that the broom shown in Figure 5 is only illustrative as a squee-gee, duster, or other type of brush or device may be used in the handle instead of the rake.

It will be understood that modifications, within the scope of the appended claims, may be made in the design and arrangement of the parts without departing from the spirit of the invention.

What is claimed is:

1. In a collapsible working implement, the combination which comprises an elongated working head substantially L-shape in cross section comprising a front plate and a cover plate and plates in the ends, one of said end plates having notches therein and the other of said end plates having an opening therein, an inner tubular section providing part of a handle for the implement and having projections extended from an end thereof, a thumb screw extended through said one of the end plates of the working head and threaded into the end of the section of the handle with the projections of the handle in the notches in the said one end plate of the working head with the handle extended through the opening in the other of said end plates of the working head, a telescoping section mounted for sliding movement in the inner section of the handle, and means on the handle for clamping the telescoping section in an extended position.

2. In a collapsible working implement, the combination which comprises an elongated working head having a front plate and a cover plate with substantially rectangular shaped end plates and said front plate and end plates having openings therethrough, one of said end plates having notches contiguous with the opening therein, a handle for the implement comprising an inner tubular section having a threaded outer end with longitudinally disposed slots therein and having an internally threaded plug in the inner end with projections on the end of said plug, a thumb screw extended through the opening in the one of said end plates and positioned to be threaded into the plug in the inner section of the handle with projections of the plug positioned in the notches in said one end plate for preventing rotation of the handle, and an outer tubular section slidably mounted in the inner section of the handle.

3. In a collapsible working implement, the combination which comprises an elongated head having a front plate and a cover plate with substantially rectangular shaped end plates and said front plate and end plates having openings therethrough, one of said end plates having notches contiguous with the opening therein, a handle for the implement comprising an inner tubular section having a threaded outer end with longitudinally disposed slots therein and having an internally threaded plug in the inner end with projections on the end of said plug, a thumb screw extended through the opening in the one of said end plates and positioned to be threaded into the plug in the inner section of the handle with projections of the plug positioned in notches in said one end plate for preventing rotation of the handle, an outer telescoping section slidably mounted in the inner section and a coupling threaded on the inner section for clamping the telescoping section in adjusted position, said telescoping section being nested in the inner tubular section and said inner tubular section positioned in the opening in the other of said end plates of said working head.

References Cited in the file of this patent

UNITED STATES PATENTS

| | | |
|---|---|---|
| 942,490 | Dunn | Dec. 7, 1907 |
| 1,678,695 | Ferguson | July 31, 1928 |
| 1,842,109 | Mullen | Jan. 19, 1932 |
| 2,110,538 | Walsh | Mar. 8, 1938 |
| 2,502,368 | Carlson | Mar. 28, 1950 |
| 2,641,012 | Storrs | June 9, 1953 |

FOREIGN PATENTS

| | | |
|---|---|---|
| 35,430 | Norway | July 31, 1922 |
| 512,282 | Germany | Nov. 8, 1930 |